United States Patent Office 3,437,348
Patented Apr. 8, 1969

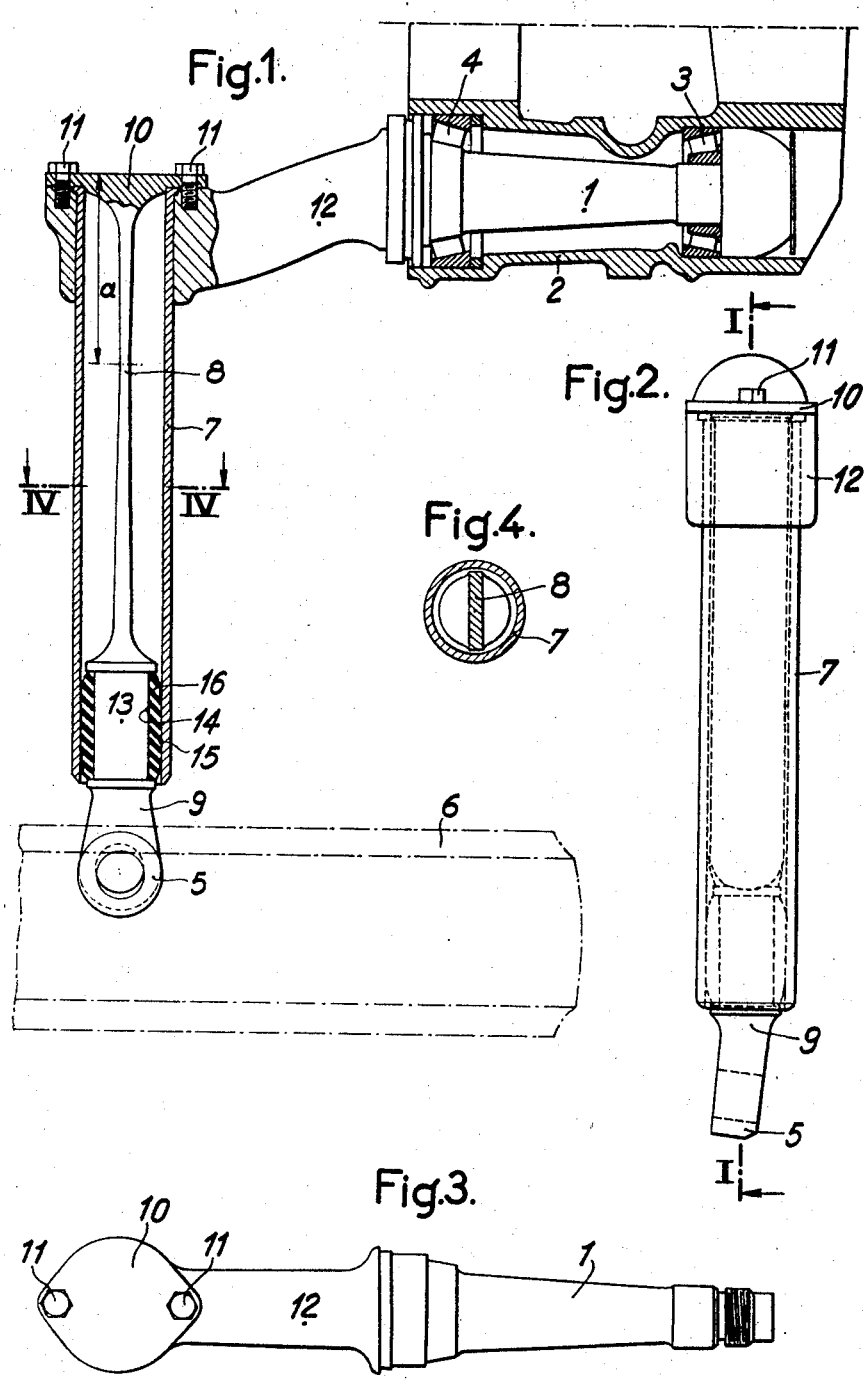

3,437,348
WHEEL SUSPENSION ARMS OF INDEPENDENT WHEEL VEHICLES
Edmond Henry-Biabaud, Paris, France, assignor to Societe Anonyme Andre Citroen, Paris, France
Filed May 11, 1967, Ser. No. 637,711
Claims priority, application France, May 13, 1966, 61,507
Int. Cl. B62d; B60g; B60p
U.S. Cl. 280—124                                    2 Claims

ABSTRACT OF THE DISCLOSURE

Suspension arm of a wheel of a vehicle having an independent suspension system, which does not transmit any load and comprises a first portion extending longitudinally in relation to the vehicle on one side thereof, said first portion being adapted to pivot on itself about its axis, and a second portion constituting an outward extension, bent substantially at right angles, of said first portion, the free end of said extension constituting a wheel stub-axle support or a wheel king-pin support; the second portion comprises a vertical resilient blade rigidly secured at its inner end and elastically at its outer end so as to permit, in addition to the normal vertical beats of the wheel, very slight longitudinal movements.

---

Independent wheels of automotive vehicles are frequently carried by bent arms comprising a first portion extending longitudinally and on one side of the vehicle, and adapted to pivot on itself about its axis, and another portion constituting the extension of the former, which is bent substantially at right angles thereto towards the exterior of the vehicle, the free end of this extension constituting a wheel stub-axle support or a wheel king-pin support.

Load is transmitted or not through these wheel arms to the chassis of the vehicle, according to the arm type.

It is the essential object of this invention to provide a specific form of embodiment of a wheel carrier arm of the type broadly set forth hereinabove, which does not transmit any load and permits, in addition to the normal vertical beats, very slight longitudinal movements of the free end of said arm.

To this end, the aforesaid outward bent extension of the wheel carrier arm of an automotive vehicle having an independent suspension system, according to the present invention, is characterized in that it consists of a tubular member open at its free end and having mounted in its cavity a resilient blade disposed in a vertical plane, one end of this blade forming an extension emerging from said open end of the tubular member, the opposite end of the resilient blade being secured to the opposite end of the tubular member. The external portion of said blade extension is shaped to constitute the wheel stub-axle support or the wheel king-pin support, and the portion of said blade extension which is located just inwards of the projecting portion is outflared, whereby its outer surface corresponds to the relevant inner surface of the tubular member surrounding it, except for a difference in diameter providing an annular space filled by a vibration-damping bushing of adequate elastomer material, such as rubber.

The aforesaid resilient blade has in the vertical direction an inertia sufficient to avoid any flexure in a vertical plane, and any transverse displacement of its inner end is prevented by rigidly securing this inner end to the corresponding tube end; besides, as this blade is disposed vertically, it permits minor longitudinal deflections of its outer end.

The attached drawing illustrates diagrammatically by way of example a typical form of embodiment of this invention. In the drawing:

FIGURE 1 is a fragmentary sectional and plan view from above of the wheel arm as seen in the direction of the arrows I—I of FIGURE 2;
FIGURE 2 is a front view of the same arm;
FIGURE 3 is a side view thereof;
FIGURE 4 is a section taken along the line IV—IV of FIGURE 1.

The wheel carrier arm illustrated in the drawing comprises a first portion 1 extending longitudinally in relation to the vehicle and mounted in a conventional manner in a support 2 provided to this end on the corresponding side of the vehicle, suitable taper-roller bearings 3 and 4 being interposed therebetween; this arm portion comprises an extension bent substantially at right angles and directed outwards of the vehicle, the free end 5 of this extension constituting a stub-axle support or a king-pin support for the wheel 6.

This extension consists of a tube 7 open at its free or outer end and having mounted therein a vertical resilient blade 8; an extension 9 of this resilient blade emerges from the open end of said tube 7 and terminates with the aforesaid stub-axle support or king-pin support 5. The inner end of blade 8 consists of a disk-shaped portion 10 secured by screws 11 to an extension 12 of the pivoting portion 1 of the wheel carrier arm; the portion 13 of the aforesaid extension of the vertical blade 8 which is located just inwards of its portion disposed externally of the open tube 7 is enlarged and so shaped that its outer surface 14 corresponds to the registering inner surface 15 of the surrounding end portion of the tube, so as to leave an annular gap therebetween; an elastic bushing 16 of suitable elastomer such as rubber is interposed between the enlarged portion 13 of the outer end of the vertical blade 8 and the corresponding portion 15 of tube 7 surrounding it, so as to fill up this annular space.

It is clear that with this arrangement, in addition to the wheel beats permitted by the pivotal movements of the arm about its longitudinal portion 1, the rigidity of the various component elements prevents a transverse displacement of the wheel support 5, the inertia of blade 8 in the vertical plane preventing any vertical displacement of said support 5, but its low inertia in the transverse direction permits slight longitudinal displacements of said support 5 which are damped out by the elastic bushing 16; the elastic properties of this bushing are selected with a view to damp out the longitudinal-elongation impulses or vibrations which might prove detrimental during the operation of the vehicle.

In the specific form of embodiment illustrated the thickness of the vertical resilient blade 8 decreases from its disk-shaped head 10 to about one-third of its length, as at *a*, and then increases gradually towards its outflared portion merging into the enlarged portion 13.

Of course, this specific form of embodiment of the invention, described hereinabove with reference to the attached drawing, should not be construed as limiting the scope of the invention since many modifications may be brought thereto without inasmuch departing from the spirit and scope of the invention as set forth in the appended claims.

What I claim is:
1. Suspension arm of a wheel of a vehicle having an independent suspension system, which does not transmit any load and comprises a first portion extending longitudinally in relation to the vehicle on one side thereof, said first portion being adapted to pivot on itself about its axis, and a second portion constituting an outward extension, bent substantially at right angles, of said first por- tion, the free end of said extension constituting a wheel stub-axle support or a wheel king-pin support, this suspension arm being characterized in that said bent extension consists of a tube open at its free end, and of a resilient blade disposed in a vertical plane within said open tube, an extension of said resilient blade emerging from the open end of said tube, the opposite blade end being disk-shaped and rigidly secured to the opposite tube end, the projecting external portion of said blade extension being shaped to constitute said wheel stub-axle support or said wheel king-pin support, the portion of said blade extension disposed just inwards of said external portion being enlarged so that its outer surface corresponds in shape to the registering inner surface of the tube end surrounding it, whereby an annular space is left between said enlarged blade portion and said tube end, said annular space being filled with a vibration-absorbing bushing of a suitable elastomer material such as rubber.

2. Wheel suspension arm according to claim 1, characterized in that the thickness of said vertical resilient blade decreases from said disk-shaped end to about one-third of its length and subsequently increases gradually towards its portion merging into said enlarged portion.

References Cited
UNITED STATES PATENTS 2,942,871   6/1960   Kraus _____ 280—124.3 X
3,333,865   8/1967   Boehner _____ 267—57 X PHILIP GOODMAN, *Primary Examiner.*

U.S. Cl. X.R.

267—57